US007257108B2

(12) United States Patent
Cheston et al.

(10) Patent No.: US 7,257,108 B2
(45) Date of Patent: Aug. 14, 2007

(54) DETERMINING THE PHYSICAL LOCATION OF RESOURCES ON AND PROXIMATE TO A NETWORK

(75) Inventors: Richard W. Cheston, Morrisville, NC (US); Daryl Carvis Cromer, Apex, NC (US); Dhruv Manmohandas Desai, Cary, NC (US); Howard Jeffrey Locker, Cary, NC (US); James Peter Ward, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 539 days.

(21) Appl. No.: 10/901,361

(22) Filed: Jul. 28, 2004

(65) Prior Publication Data

US 2006/0023671 A1    Feb. 2, 2006

(51) Int. Cl.
*H04Q 7/24* (2006.01)
(52) U.S. Cl. .................. 370/338; 370/328; 370/351; 455/41.2; 455/445; 340/10.1
(58) Field of Classification Search ............... 370/338, 370/328, 351; 455/41.2, 445; 340/10.1; 235/462.13
See application file for complete search history.

(56) References Cited

U.S. PATENT DOCUMENTS

| 5,226,120 | A | 7/1993 | Brown et al. |
| 5,559,955 | A | 9/1996 | Dev et al. |
| 5,572,640 | A | 11/1996 | Schletter |
| 5,606,664 | A | 2/1997 | Brown et al. |
| 5,684,796 | A | 11/1997 | Abidi et al. |
| 5,706,440 | A | 1/1998 | Compliment et al. |
| 5,745,682 | A | 4/1998 | Keenan |
| 5,793,975 | A | 8/1998 | Zeldin |
| 5,909,429 | A | 6/1999 | Satyanarayana et al. |
| 6,131,119 | A | 10/2000 | Fukui |
| 6,272,541 | B1 | 8/2001 | Cromer et al. |
| 6,327,623 | B2 | 12/2001 | Watts |
| 6,397,249 | B1 | 5/2002 | Cromer et al. |
| 6,405,236 | B1 | 6/2002 | Nieratschker |
| 6,601,097 | B1 | 7/2003 | Cheston et al. |
| 2002/0059230 | A1* | 5/2002 | Hunepohl et al. .............. 707/6 |
| 2004/0178270 | A1* | 9/2004 | Pradhan et al. ......... 235/462.13 |
| 2005/0160180 | A1* | 7/2005 | Rabje et al. ................. 709/238 |

* cited by examiner

*Primary Examiner*—Danh Le
(74) *Attorney, Agent, or Firm*—Rogitz & Associates; Carlos Munoz-Busta

(57) ABSTRACT

A network includes a plurality of wall plates, each of the wall plates couples a network resource such as a computer or a network attached device to the network and includes an RFID circuit to detect proximate devices having an RFID tag. The proximate devices can be network attached devices or non network attached devices such as desks, phones, and artwork. Logic is included within each wall plate which includes wall plate physical location information. The logic is designed to respond to a broadcast signal. In so doing, the physical location of any resource can be determined. The physical location of all known resources are provided to an inventory application in the network, thereby allowing network administrators and users to remotely determine the physical location (room, floor, building, etc.) of any and all known resources attached to the network. Likewise, local computer users are able to identify the network resources located in their vicinity.

24 Claims, 4 Drawing Sheets

DETERMINING THE PHYSICAL LOCATION OF RESOURCES ON AND PROXIMATE TO A NETWORK

BACKGROUND OF THE INVENTION

The present invention relates in general to processing systems and, in particular, to a method and system for physically locating devices for use with computers in such a network.

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse and an optional network interface adapter. One of the distinguishing characteristics of these systems is the use of a motherboard or system planar to electrically connect these components together.

A business may establish a network of such personal computers and network attached devices. The network provides for transmission of data. Manageability on large networks allows network administrators to update code (BIOS, OS, drivers, applications) or to inventory assets (memory, HDD, processors). However, it is impossible to determine where the computers and devices are physically located. Since Ethernet is a broadcast medium, there is no mechanism to determine physical location.

This is a large problem for corporations who have thousands of computers and devices on their network. It is important to determine physical location for repair actions, returning computers when leases expire, etc. Conventional solutions allow for the determination of whether if a computer is on the network, not physically where it is located.

SUMMARY OF THE INVENTION

Accordingly, a need exists for a data processing system and method to allow a network administrator to remotely determine the physical location (room, floor, building, etc.) of any and all computers and devices attached to the network and of other resources which are proximate to the network. The present invention addresses such a need.

A method for determining the physical locations of a plurality of resources in and near a network is disclosed. The network includes a plurality of wall plates, each of the wall plates for coupling a network attached resource such as a computer or a network attached device to the network. The method and system comprises providing additional information using a physical layer and logic in each of the wall plates. For network attached resources, the method and system further comprises capturing and storing the system media access controller (MAC) address of the computer or device in the additional logic of each of the plurality of wall plates and storing a physical address of the wall plate in the logic of each of the plurality of wall plates. For non network attached devices within wireless reach of the wall plate such as desks and phones, another unique identifier is stored, such as a unique RFID tag, rather than the MAC address. The method and system also comprises providing a command from the network that will cause the system MAC address, or other unique identifier (RFID), and the physical address of at least one of the resources to be provided to an application in the network.

A system and method in accordance with the present invention adds a low cost physical layer and logic within an Ethernet wall plate associated with the resource on or near the network. The logic is designed to respond to a broadcast signal to a UDP (User Datagram Protocol) port. In so doing the physical location of the computer, device, or other resource can be determined.

In a preferred embodiment, a command is provided from the network that will cause the MAC address or the RFID tag and the physical address of at least one of the plurality of resources to be provided to an inventory application in the network, thereby allowing a network administrator or end user to remotely determine the physical location (room, floor, building, etc.) of any and all resources attached to or in the approximate vicinity of the network.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

The present invention relates in general to processing systems and, in particular, to a method and system for physically locating a computer in such a network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
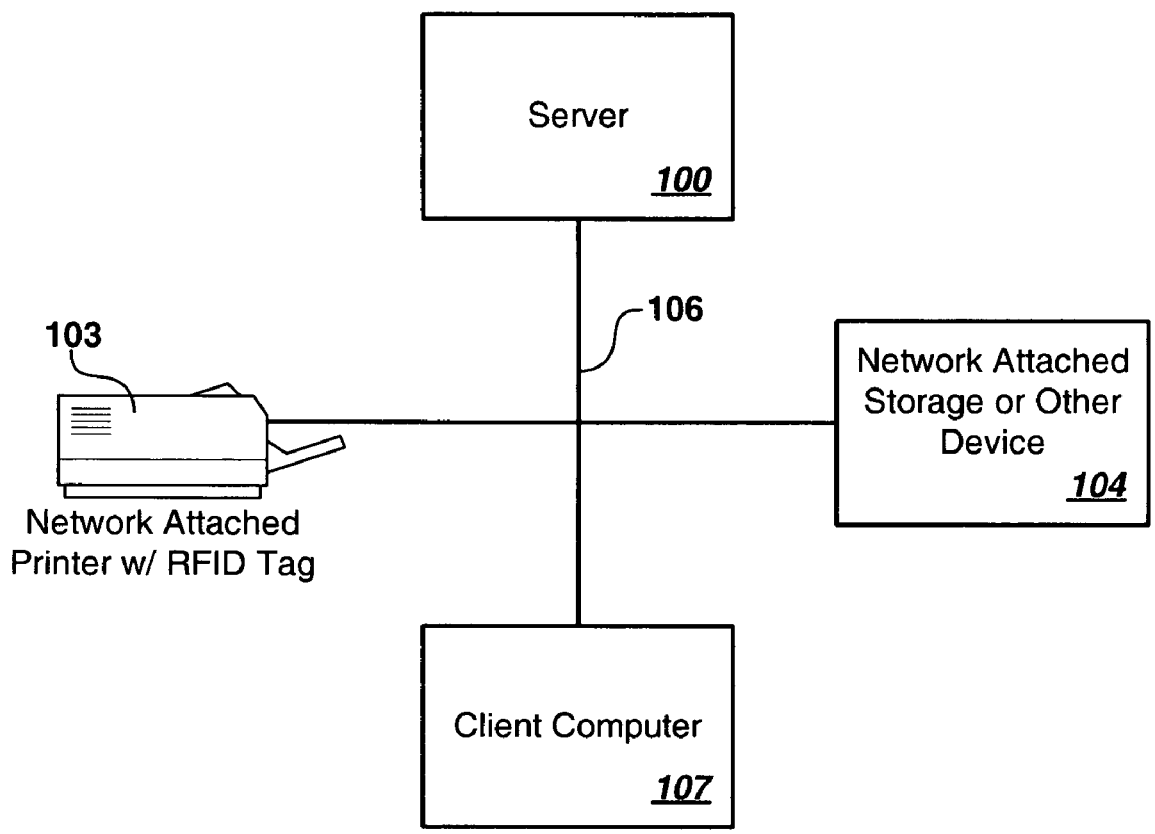
FIG. 1 illustrates a pictorial representation of a network including server and remote computer systems and network attached devices in accordance with the method and system of the present invention.

FIG. 1 illustrates a pictorial representation of a network including server and remote computer systems in accordance with the method and system of the present invention. Network 10 is controlled by server computer system 100 and includes a plurality of client computer systems, such as client computer system 107, and network attached devices such as network attached printer 103, and network attached storage 104. Client computer systems and network attached devices have a communication link 106 established between client 107, network attached devices 103 and 104, and server 100. The communication link is preferably established utilizing Ethernet technology.

Figure 2:
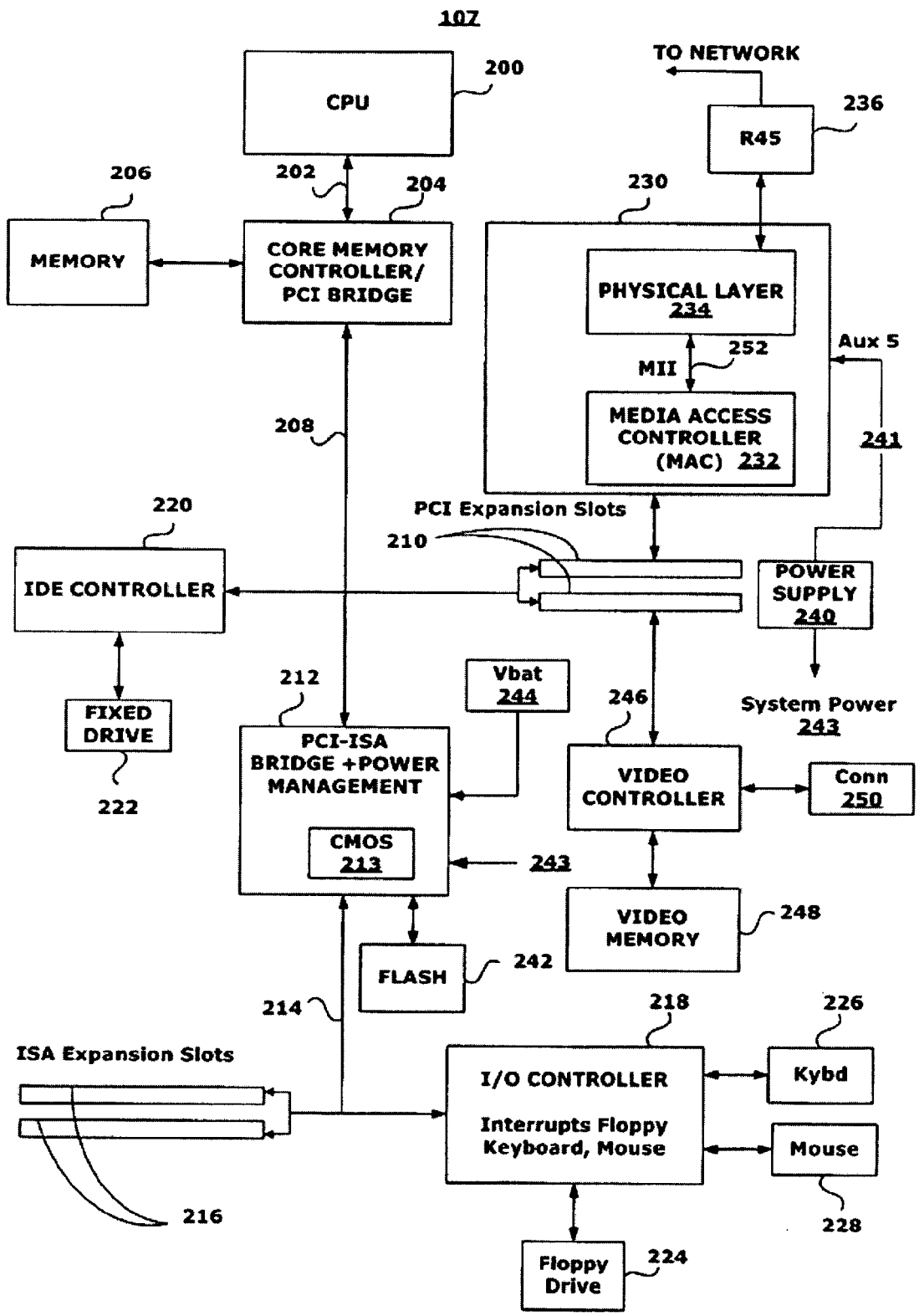
FIG. 2 depicts a more detailed pictorial representation of a client computer system in accordance with the method and system of the present invention.

FIG. 2 depicts a more detailed pictorial representation of a computer system 107 which also may be utilized to implement server 100 in accordance with the method and system of the present invention. Computer system 107 includes a planar (also commonly called a motherboard or system board) which is mounted within computer 107. The components of computer 107 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer system 107 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 207 through connector 250.

Computer system 107 includes a power supply 240 which supplies full normal system power 243, and has an auxiliary power main AUX 5 241 which supplies full time power to the power management logic 212.

Computer system 107 also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer 107 to communicate with proxy 102 utilizing communication link 108.

MAC 232 processes digital network signals, and serves as an interface between a shared data path, i.e., the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over network 10. Physical layer 234 is also responsible for wave shaping and provides analog voltages to network 10. In a preferred embodiment, physical layer 234 is implemented utilizing an Integrated Services chip ICS-1890.

A system and method in accordance with the present invention adds a low cost physical layer and logic within an Ethernet wall plate associated with the computer on the network. The additional physical layer/subsystem is designed to respond to a broadcast signal to a UDP (User Datagram Protocol) port. In so doing the physical location of the computer can be determined.

Figure 3:
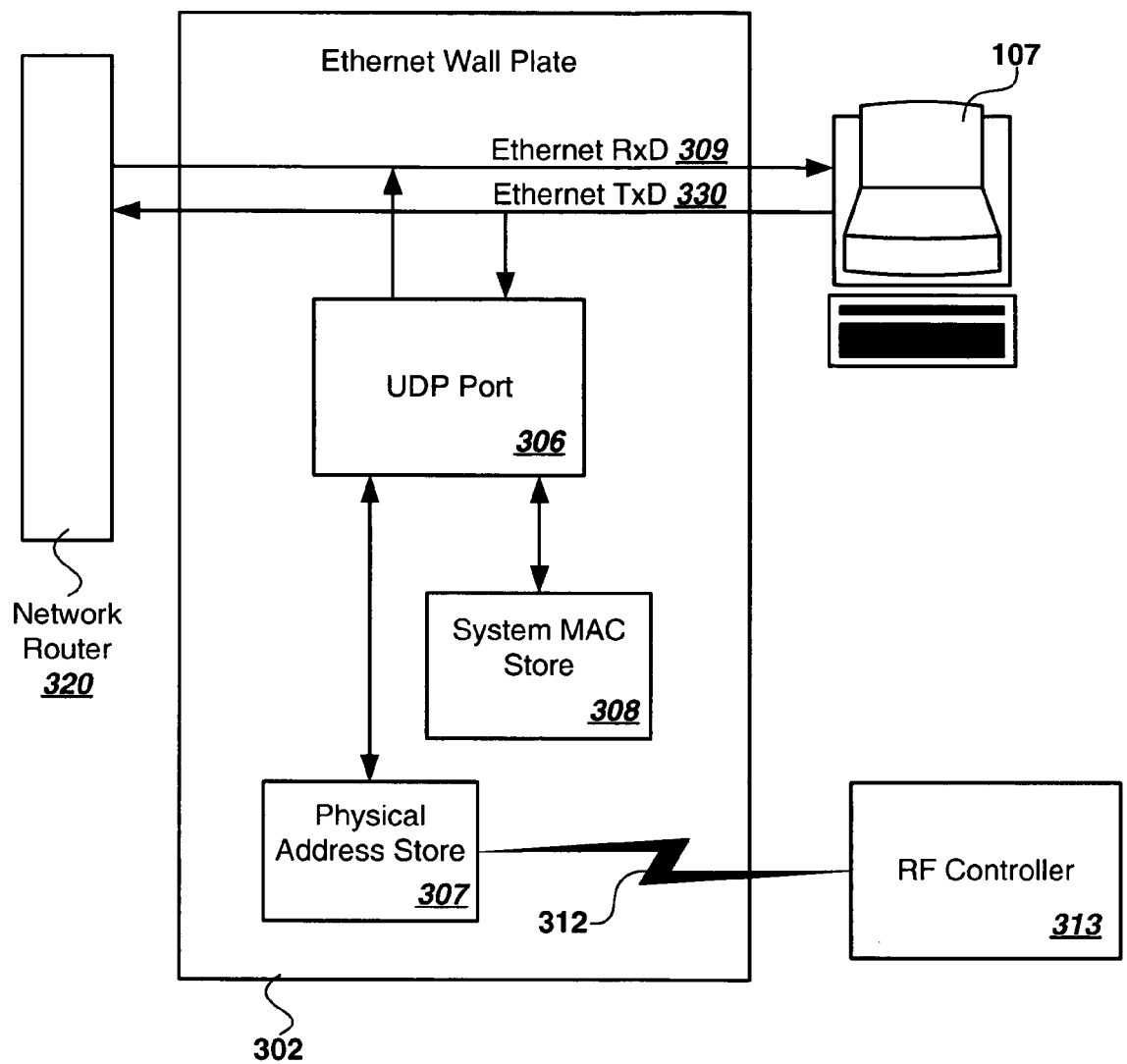
FIG. 3 is a block diagram of a system in accordance with the present invention.

To more particularly describe the features of the present invention, refer now to the following description and the accompanying figures. FIG. 3 is a block diagram of a system 300 in accordance with the present invention. This figure illustrates one computer system in a network which would advantageously utilize the concepts in accordance with the present invention. In a preferred embodiment, each of the computers in the network would have the same features therewithin.

The system 300 includes an Ethernet wall plate 302 which couples the computer 107 with the network 320. The wall plate 302 provides signals from the network to the computer 107 and provides signals from the computer 107 to the network. Ethernet RxD [receive] data 309 and Ethernet TxD [transmit] 330 are coupled to computer 107 via a R45 connector 236 (FIG. 2) which is part of network adapter 230 (FIG. 2).

The Ethernet wall plate 302 includes an additional subsystem physical layer 306. In a preferred embodiment, the physical layer 306 only responds to a predefined number, a User Datagram Protocol (UDP) port.

The UDP port 306 receives data from the physical address storage 307 and system MAC storage 308. The System MAC storage 308 stores the MAC address of the Ethernet system of the computer connected to the Ethernet wall plate 302 by snooping the Ethernet Txd (Transmit Data) line 330 from the computer 107. The Ethernet Txd line 330 is active only when the computer 107 is transmitting Ethernet packets. Each Ethernet packet contains the MAC address of the computer connected to that Ethernet wall plate 302. The MAC address of the computer 107 comprises a unique number for each computer. The UDP port 306 parses the MAC address and stores it in the System MAC storage area 308. Snooping occurs every time a packet is transmitted on line 330. If computer 107 is replaced, the MAC address of the new computer is captured and detected.

The second storage area is the Physical Address Storage 307. The Physical Address Storage 307 includes in a preferred embodiment a wireless RF interface 312 as well as a direct connection to the UDP port 306. In a preferred embodiment, a hand held RF controller 313 is used to write in the physical location of the wall plate 302 into the Ethernet wall plate 302. The physical location information includes, for example, building number, floor and office. This information is written only when the wall plate is inserted into the wall. Therefore, the UDP port 306 will now contain the physical location of the wall plate and the MAC address of the computer 304 attached to the wall plate 302.

Accordingly, a UDP protocol is utilized by a software application in the network to send out a UDP command to a common UDP Port number for the inventory function to every wall plate of the network. The software application is preferably an inventory application. In a preferred embodiment, a UDP port number used for inventory applications can be reserved by submitting a Request for Comments (RFC). Furthermore, the port number to the particular UDP port will then be assigned.

Accordingly, each of the wall plates that have the UDP port will send an Ethernet packet containing the MAC address of the computer and the Physical Address of the wall plate when a command is provided from the network. The inventory application will then gather this information, and determine the actual physical location of each of the computers on the network.

A system and method in accordance with the present invention adds a low cost physical layer/subsystem within an Ethernet wall plate associated with the computer on the network. The additional physical layer/subsystem is designed to respond to a broadcast signal to a UDP (User Datagram Protocol) port. In so doing the physical location of the computer can be determined.

Figure 4:
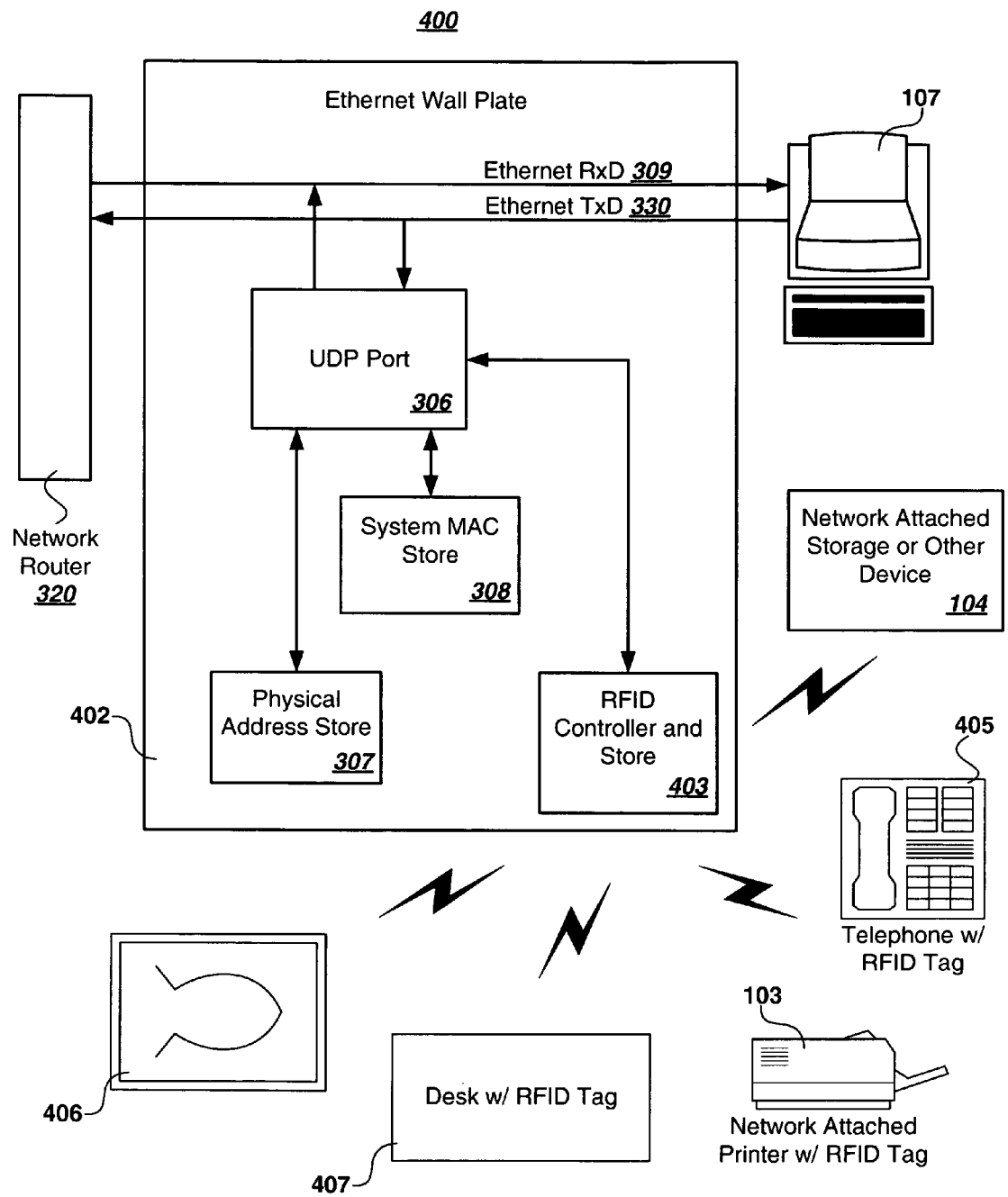
FIG. 4 is a block diagram of a system in accordance with the present invention.

FIG. 4 is a block diagram of a system in accordance with the present invention. The system 400 shown in FIG. 4 functions in much the same way as system 300 of FIG. 3. In some instances, like numerals to those shown in prior drawings are used to emphasize that those functional blocks operate in a manner which has heretofore been described, and who's operational description shall not be repeated. System 400 contains a wall plate 402 which is made using an additional RFID controller 403. RFID controller 403 is capable of energizing and reading industry standard RFID tags and includes a storage suitable for storing a list of any RFID tags found within its vicinity.

Two fundamental types of RFID technology exist: passive and active. Passive tags are energized by the RF field provided by the reader and require no other source of power (batteries, etc). Passive tags "wake up" when they are in-field and respond with a unique identifier. Active tags are independently powered (usually battery) and continuously broadcast their identifier (ID). Closely associated with the class of the tag (passive or active) is the carrier frequency. Tradeoffs exist between range, power, etc when considering active vs. passive implementations. Traditionally, passive tags are relatively lower frequency (125 kHz, 13 Mhz, 900 Mhz ranges) with subsequent shorter range (for both transmission and power utilization considerations) while active tags are typically in the 2.45 GHz range. Passive technology usually equates to lower-cost and is prevalent in the scannable asset tagging domain (library books, packaging, etc). Active technology can have significant range and is used for transport ID (freight trains, auto toll collection, pallet level distribution, etc).

In either case, the identifier is used to establish a communication channel with the RF reader, such as RFID controller 403. The RF reader is always the 'active transmitter' and serves as the master in the communication sequences. Those skilled in the art are familiar with how to arbitrate and differentiate multiple tags in-field at a given time and how to establish singular sequential secure communication channels with each. Once a given tag is 'selected' the reader can then communicate via reads or writes with the tag. Information is aliased onto the base carrier typically using AM schemes. In its simplest implementations RFID may be read only where the tag simply broadcasts its ID (analogous to a barcode).

Embodiments of the present invention can encompass any of the above RFID implementations. However, in the embodiment shown in FIG. 4, RFID controller 403 (and each respective tag) is passive, operates according to the ISO 14443 RFID specification published by the International Standards Organization (which is incorporated herein by reference), and is able to detect the presence of RFID tags within thirty feet of its proximity. Any found RFID tags for resources within thirty feet are stored in the storage unit of RFID controller and storage 403 as unique identifiers. In addition to sending the physical address and Mac address information to the inventory program, wall plate 402 sends any unique identifiers found and stored within storage 403.

The ISO 14443 RFID specification is available in four parts from the international standards organization web site which at the time of this writing was located at www.iso.org. The four parts are entitled:

"ISO/IEC 14443-1:2000 Identification cards—Contactless integrated circuit (s) cards—Proximity cards—Part 1: Physical characteristics,"

"ISO/IEC 14443-2:2001 Identification cards—Contactless integrated circuit (s) cards—Proximity cards—Part 2: Radio frequency power and signal interface (available in English only);"

"ISO/IEC 14443-3:2001 Identification cards—Contactless integrated circuit (s) cards—Proximity cards—Part 3: Initialization and anticollision;" and "ISO/IEC 14443-4:2001 Identification cards—Contactless integrated circuit (s) cards—Proximity cards—Part 4: Transmission protocol."

Devices which are on or off the network can include an RFID tag. Shown in FIG. 4 are network attached printer 103 and storage device 104 which can be connected to network 106 using the ethernet wall plate 402 or 302 or a standard ethernet wall plate having no physical address or unique identifier stores 307 and 308.

Through the use of wall plate 402 having RFID controller and storage 403, the physical location of other non network resources can also be accounted for. For example, using the inventory program, a user entering the building having a network 10 installed therein can query the inventory program and determine the physical location of a desk. The inventory program can respond with a list of all rooms having desks, or a list of all rooms having desks for which no active ethernet connection exists (since this information is bound to the wall plate) such as desk 407. The physical location of other non network resources can be tracked such as telephone 405, and artwork piece 406. Keeping track of artwork such as artwork piece 406 is beneficial particularly when the artwork is expensive. The concepts described herein allow for the detection of movement for valuable pieces wherein the movement is tracked via RFID tag. Where such movement turns out to be theft, the specific movement of the piece to the building and the time of the incident are decipherable by examining the inventory program entries.

Accordingly, in a preferred embodiment, each of the wall plates that have the UDP port will send an Ethernet packet containing the MAC address of the computer (if attached), or the RFID tag identifiers of all network and non network resources within RFID reach of the wall plate, and the Physical Address of the wall plate when a command is provided from the network. The inventory application will then gather this information, and determine the actual physical location of each of the resources on or proximate to the network.

An Embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a wall plate which provides access to a network and houses a store containing information related to the physical location of the wall plate;
   a system Media Access Controller (MAC) store which contains information related to the MAC address of a computer system coupled to said wall plate and obtaining network access therefrom;
   a wireless identification (ID) controller housed in said wall plate and configured to read wireless ID tag information provided by a proximate resource;
   a network port which is operatively coupled to said wall plate, said system MAC store, and said wireless ID controller and which responds to a predetermined command received at the port by transmitting the physical location information contained in the store of said wall plate, the information related to the Mac address, and the ID tag information over the network.

2. Apparatus according to claim 1 wherein the predetermined command originates from an inventory program executed on a network computer and wherein the physical location information and ID tag information are provided to the inventory program.

3. Apparatus according to claim 1 wherein the network is an ethernet local area network.

4. Apparatus according to claim 1 wherein the wireless ID tag information is an RFID tag.

5. Apparatus according to claim 1 wherein the wireless ID controller includes an ID storage which retains the read ID tag information.

6. Apparatus according to claim 1 wherein the network port is a User Datagram Protocol (UDP) port.

7. A method comprising:
   storing physical location information in a storage area of a wall plate which provides access to a network, the stored physical location information being related to the physical location of wall plate;
   storing information related to the MAC address of a computer system coupled to the wall plate;
   reading wireless ID tag information provided by a resource which is proximate to the wall plate;
   transmitting the scored physical location information, the information related to the Mac address, and the read wireless ID tag information over the network provided by the wall plate.

8. The method of claim 7, further comprising:
   receiving a predetermined command at a network port housed within the wall plate;
   wherein said transmission is responsive to said reception.

9. The method of claim 7 wherein the network port is a User Datagram Protocol (UDP) port.

10. The method of claim 7 wherein the predetermined command originates from an inventory program executed on a network computer and wherein the physical location information and ID tag information are provided to the inventory program.

11. The method of claim 7 wherein the network is an ethernet local area network.

12. The method of claim 7 wherein the wireless ID tag information is an RFID tag.

13. A service comprising:
   installing a plurality of wall plates, each wall plate provides computer access to a network;
   providing a physical layer and logic within each of the wall plates wherein the logic is capable of storing physical address information which is related to the physical location of the wall plate and wherein the logic is capable of storing information related to the MAC address of a computer system coupled to the wall plate to obtain network access therefrom and wherein the logic is capable of storing wireless ID information provided by a resource which is proximate to wall plate; and
   providing a command from the network that will cause the physical address information, the information related to the Mac address, and the wireless ID information to be provided to a network application.

14. The service of claim 13 in which the physical layer comprises a User Datagram Protocol (UDP) port.

15. The service of claim 13 in which each of the plurality of wall plates comprises an Ethernet wall plate.

16. The service of claim 13 wherein the application comprises an inventory application.

17. The service of claim 13 wherein a wireless interface is utilized to write the physical location information into the wall plate.

18. The service of claim 13 wherein the physical location information includes a building number, floor, and office where the wall plate is located.

19. A product comprising:
a computer readable medium having computer executable code stored therein, the computer executable code in said product to be effective to:
store physical location information in a storage area of a wall plate which provides access to a network, the stored physical location information being related to the physical location of wall plate;
store information related to the MAC address of a computer system coupled to the wall plate;
read wireless ID tag information provided by a resource which is proximate to the wall plate;
transmit the stored physical location information, the information related to the Mac address, and the read wireless ID tag information over the network provided by the wall plate.

20. The product of claim 19 wherein the code is further effective to:
receive a predetermined command at a network port housed within the wall plate;
wherein said transmission is responsive to said reception.

21. The product of claim 19 wherein the network port is a User Datagram Protocol (UDP) port.

22. The product of claim 19 wherein the predetermined command originates from an inventory program executed on a network computer and wherein the physical location information and ID tag information are provided to the inventory program.

23. The product of claim 19 wherein the network is an ethernet local area network.

24. The product of claim 19 wherein the wireless ID tag information is an RFID tag.

* * * * *